(12) United States Patent
Larson

(10) Patent No.: US 8,963,804 B2
(45) Date of Patent: Feb. 24, 2015

(54) METHOD AND SYSTEM FOR OPERATING A NEAR-TO-EYE DISPLAY

(75) Inventor: Brent D. Larson, Cave Creek, AZ (US)

(73) Assignee: Honeywell International Inc., Morristown, NJ (US)

(*) Notice: Subject to any disclaimer, the term of this patent is extended or adjusted under 35 U.S.C. 154(b) by 1259 days.

(21) Appl. No.: 12/261,279

(22) Filed: Oct. 30, 2008

(65) Prior Publication Data

US 2010/0109975 A1    May 6, 2010

(51) Int. Cl.
  *G09G 5/00* (2006.01)
  *G02B 27/01* (2006.01)
  *G06F 3/01* (2006.01)

(52) U.S. Cl.
  CPC .............. *G02B 27/017* (2013.01); *G06F 3/012* (2013.01); *G02B 2027/0187* (2013.01)
  USPC ............................................................ 345/8

(58) Field of Classification Search
  None
  See application file for complete search history.

(56) References Cited

U.S. PATENT DOCUMENTS

| | | | |
|---|---|---|---|
| 3,678,283 A | 7/1972 | Labaw | |
| 3,917,412 A | 11/1975 | Stoutmeyer et al. | |
| 4,111,555 A | 9/1978 | Ellis | |
| 4,421,486 A | 12/1983 | Baldwin et al. | |
| 4,446,480 A | 5/1984 | Breglia et al. | |
| 4,634,384 A | 1/1987 | Neves et al. | |
| 4,896,962 A * | 1/1990 | Menn et al. | 356/139.03 |
| 5,072,218 A * | 12/1991 | Spero et al. | 340/980 |
| 5,093,567 A | 3/1992 | Staveley | |
| 5,138,555 A * | 8/1992 | Albrecht | 701/14 |
| 5,266,930 A | 11/1993 | Ichikawa et al. | |
| 5,345,944 A | 9/1994 | Hongo et al. | |
| 5,424,556 A | 6/1995 | Symosek et al. | |
| 5,495,427 A | 2/1996 | Puma et al. | |
| 5,572,203 A | 11/1996 | Golia et al. | |
| 5,717,414 A * | 2/1998 | Bergsneider et al. | 345/8 |
| 5,721,679 A * | 2/1998 | Monson | 701/50 |
| 5,742,264 A | 4/1998 | Inagaki et al. | |
| 5,812,257 A | 9/1998 | Teitel et al. | |
| 5,828,770 A * | 10/1998 | Leis et al. | 382/103 |
| 5,856,844 A * | 1/1999 | Batterman et al. | 348/207.99 |
| 6,094,007 A * | 7/2000 | Faul et al. | 313/512 |
| 6,203,497 B1 * | 3/2001 | Dekel et al. | 600/439 |
| 6,359,601 B1 | 3/2002 | Maguire, Jr. | |
| 6,943,754 B2 | 9/2005 | Aughey et al. | |
| 6,972,733 B2 | 12/2005 | Maguire, Jr. | |
| 7,046,215 B1 * | 5/2006 | Bartlett | 345/8 |
| 7,148,860 B2 | 12/2006 | Kooi et al. | |

(Continued)

FOREIGN PATENT DOCUMENTS

EP      0643314 A2    3/1995

OTHER PUBLICATIONS

EP Search Report, EP 09173992.0 dated Feb. 5, 2010.

(Continued)

*Primary Examiner* — Antonio Xavier
(74) *Attorney, Agent, or Firm* — Ingrassia Fisher & Lorenz, P.C.

(57) ABSTRACT

Methods and system for operating a near-to-eye (NTE) display movably coupled to a headset are provided. Information representative of at least one spatial degree of freedom of the NTE display relative to at least one spatial degree of freedom of the headset is received. Spatial coordinates of the NTE display are determined based on said received information. The NTE display is controlled based on the spatial coordinates of the NTE display.

9 Claims, 8 Drawing Sheets

(56) References Cited

U.S. PATENT DOCUMENTS

| | | | |
|---|---|---|---|
| 7,301,648 B2 | 11/2007 | Foxlin | |
| 7,312,766 B1 | 12/2007 | Edwards | |
| 7,401,920 B1 | 7/2008 | Kranz et al. | |
| 7,554,511 B2* | 6/2009 | Fager et al. | 345/7 |
| 7,817,104 B2* | 10/2010 | Ryu et al. | 345/7 |
| 2001/0054989 A1 | 12/2001 | Zavracky et al. | |
| 2004/0016309 A1* | 1/2004 | Catala Garcia et al. | 73/865.9 |
| 2004/0104864 A1* | 6/2004 | Nakada | 345/8 |
| 2004/0169617 A1* | 9/2004 | Yelton et al. | 345/1.1 |
| 2005/0010109 A1* | 1/2005 | Faul | 600/427 |
| 2005/0172711 A1* | 8/2005 | Gombert | 73/161 |
| 2005/0201613 A1* | 9/2005 | Mostafavi | 382/154 |
| 2006/0033713 A1* | 2/2006 | Pryor | 345/158 |
| 2006/0222314 A1* | 10/2006 | Zumbrunn et al. | 385/147 |
| 2006/0238878 A1* | 10/2006 | Miyake et al. | 359/630 |
| 2006/0284736 A1* | 12/2006 | Low | 340/980 |
| 2006/0284792 A1* | 12/2006 | Foxlin | 345/8 |
| 2007/0003915 A1* | 1/2007 | Templeman | 434/247 |
| 2007/0058173 A1* | 3/2007 | Holzapfel | 356/499 |
| 2007/0081695 A1* | 4/2007 | Foxlin et al. | 382/103 |
| 2008/0048931 A1* | 2/2008 | Ben-Ari | 345/8 |
| 2008/0146302 A1* | 6/2008 | Olsen et al. | 463/7 |
| 2008/0212840 A1* | 9/2008 | Shalom et al. | 382/108 |

OTHER PUBLICATIONS

EP Communication, EP 09173992.0-2217 dated Nov. 24, 2011.

* cited by examiner

METHOD AND SYSTEM FOR OPERATING A NEAR-TO-EYE DISPLAY

TECHNICAL FIELD

The present invention generally relates to head-up displays (HUDs), and more particularly relates to methods and systems for operating near-to-eye (NTE) displays.

BACKGROUND

Modern vehicles, such as aircraft, often include head-up displays (HUDs) that project various symbols and information onto a transparent display, or image combiner, through which a user (e.g., the pilot) may simultaneously view the exterior or a display device, such as an liquid crystal display (LCD), on which a digital representation of the terrain outside the aircraft is shown. Traditional HUDs incorporate fixed image combiners located above the instrument panel on the windshield of the aircraft, or directly between the windshield and the pilot's head.

Over the years, near-to-eye (NTE) displays have been developed that typically include an image combiner in close proximity to the user's eye and in a fixed position relative to the user's head. As such, NTE displays are also often referred to as helmet-mounted-displays (HMDs), head-mounted-displays (also HMDs), head-worn-displays (HWDs), or by other names or acronyms. Many applications which utilize these displays rely in part on knowing the detailed viewing geometry. Typically, this is accomplished with a system referred to as a "head tracker" or "tracking assembly." While head position and orientation may be important, it is often even more beneficial to know the specific position and orientation of the display unit or ocular (i.e., the NTE display screen) itself, as opposed to the head of the user.

Many tracking methods have been developed and utilized. For example, magnetic trackers have long been utilized in military applications. Recently, much interest has been shown in optical trackers that utilize multiple light sources and light detectors in a variety of geometries. One drawback of current optical trackers is that in order to accurately track the motion of the NTE display itself, the NTE display often includes large and bulky components that reduce the user's comfort.

Accordingly, it is desirable to provide an improved method and system for operating a NTE display which allows for a simpler, smaller, and lighter headset assembly. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating a near-to-eye (NTE) display movably coupled to a headset is provided. Information representative of at least one spatial degree of freedom of the NTE display relative to at least one spatial degree of freedom of the headset is received. Spatial coordinates of the NTE display are determined based on said received information. The NTE display is controlled based on the spatial coordinates of the NTE display.

A headset is provided. The headset includes a frame configured to be worn on a head of a user, a near-to-eye (NTE) display movably coupled to the frame, and a plurality of reference elements. Each of the plurality of reference elements is coupled to and in a fixed position relative to one of the frame and the NTE display. The plurality of reference elements are configured to generate information representative of at least one spatial degree of freedom of the NTE display relative to at least one spatial degree of freedom of the frame.

An avionics system is provided. The avionics system includes a headset comprising a frame configured to be worn on a head of a user, a near-to-eye (NTE) display movably coupled to the frame of the headset, a plurality of reference elements configured to generate information representative of at least one spatial degree of freedom of the NTE display relative to at least one spatial degree of freedom of the frame, and a controller in operable communication with the NTE display. The controller is configured to receive the information representative of at least one spatial degree of freedom of the NTE display relative to at least one spatial degree of freedom of the headset from the plurality of reference elements, determine spatial coordinates of the NTE display based on said received information, and control the NTE display based on the spatial coordinates of the NTE display.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-8 are merely illustrative and may not be drawn to scale. Additionally, in several of the drawings, a Cartesian coordinate system, including x, y, and z axes and/or directions, is shown to clarify the relative position and/or orientation of the components, according to the various embodiments. However, this coordinate system is only intended to assist in the explanation of various aspects of the present invention, and should be not construed as limiting.

FIG. 1 to FIG. 8 illustrate methods and systems for operating a near-to-eye (NTE) display movably coupled to a headset. Information representative of at least one spatial degree of freedom of the NTE display relative to at least one spatial degree of freedom of the headset is received. Spatial coordinates of the NTE display are determined based on said received information. The NTE display is controlled based on the spatial coordinates of the NTE display.

The received information may be generated by a plurality of "reference elements" or tracker elements. The reference elements may be any one of many different types of components that may be used to track the position and motion of the NTE display and/or the headset or portions thereof. Examples include transmitters, receivers, reflectors, absorbers, transducers, etc., including various technology types, such as optical, radio frequency (RF), magnetic, sonic, and inertial.

As described below, in one embodiment, essentially two tracking assemblies (or systems) are used. The first tracking assembly tracks the headset (or helmet), while the second tracking assembly tracks the relative position and/or orientation of the display ocular (i.e., the NTE display) with respect to the first tracking assembly. This second tracking assembly may take several different forms and include, for example, mechanical transducers, optical transducers, or other mechanisms suitable for monitoring the relative geometry. In one embodiment, the second tracking assembly shares reference elements (e.g. cameras) with the first tracking assembly.

Figure 1:
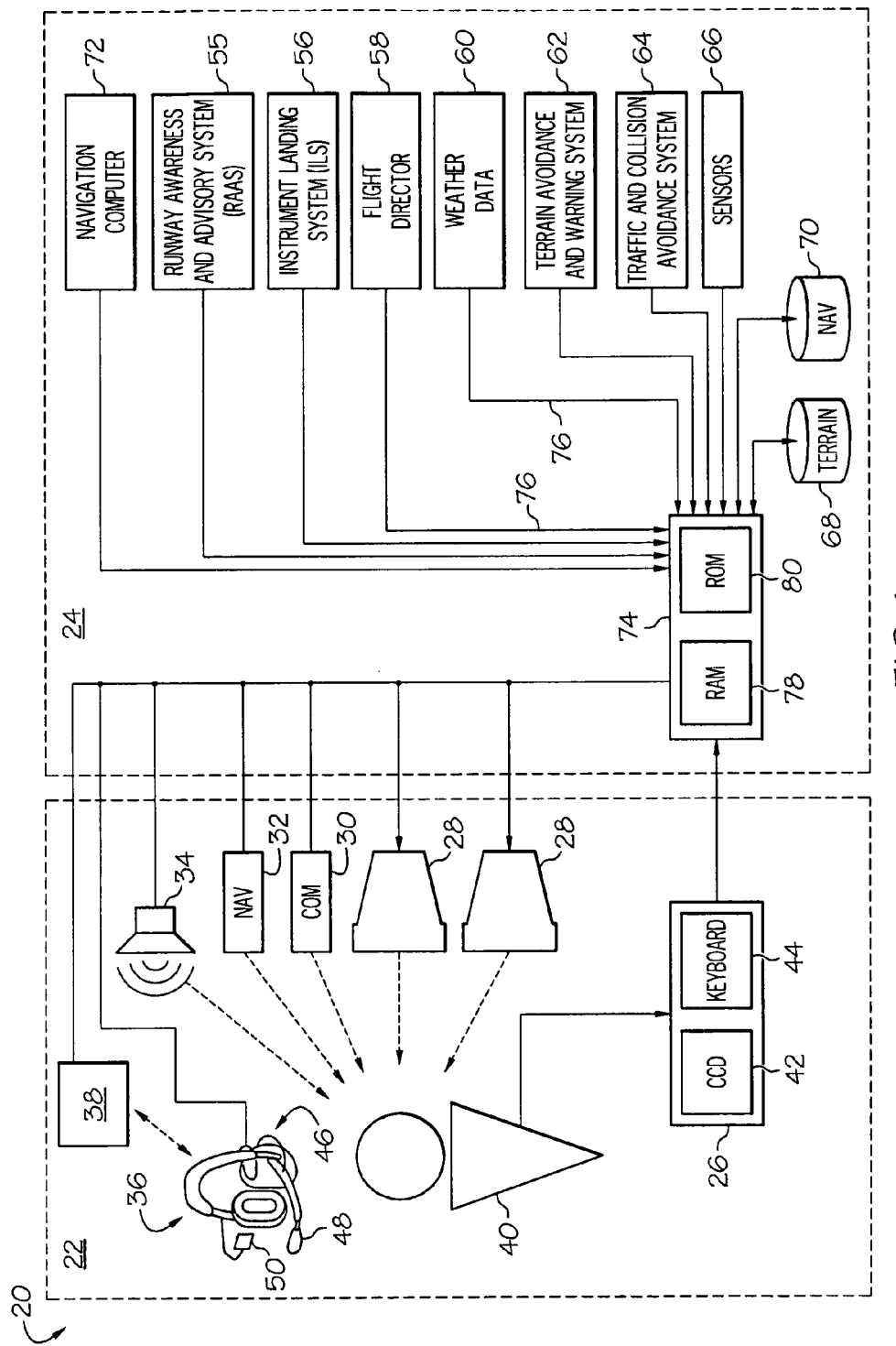
FIG. 1 is a schematic block diagram of an aircraft, according to one embodiment of the present invention.

FIG. 1 schematically illustrates a vehicle 20, such as an aircraft, according to one embodiment of the present invention. The vehicle 20 may be, in one embodiment, any one of a number of different types of aircraft such as, for example, a private propeller or jet engine driven airplane, a commercial jet liner, or a helicopter. In the depicted embodiment, the aircraft includes a flight deck 22 (or cockpit) and an avionics/flight system (or avionic system) 24. Although not specifically illustrated, it should be understood that the aircraft 20 also includes a frame or body to which the flight deck 22 and the avionics/flight system 24 are connected, as is commonly understood. It should also be noted that aircraft 20 is merely exemplary and could be implemented without one or more of the depicted components, systems, and data sources. It will additionally be appreciated that the aircraft 20 could be implemented with one or more additional components, systems, or data sources.

The flight deck 22 includes a user interface 26, display devices 28 (e.g., a primary flight display (PFD)), a communications radio 30, a navigational radio 32, an audio device 34, a headset 36, and a head (and/or eye) motion tracker 38.

The user interface 26 is configured to receive input from a user 40 (e.g., a pilot) and, in response to user input, supply command signals to the avionics/flight system 24. The user interface 26 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 26 includes a CCD 42 and a keyboard 44. The user 40 uses the CCD 42 to, for example, move a cursor symbol on the display devices 28, and use the keyboard 44 to, for example, input textual data.

Still referring to FIG. 1, the display devices 28 are used to display various images and data, in graphic, iconic, and/or textual formats, and to supply visual feedback to the user 40 in response to the user input commands supplied by the user 40 to the user interface 26. It will be appreciated that the display devices 28 may each be implemented using any one of numerous known displays suitable for rendering image and/or text data in a format viewable by the user 40, such as a cathode ray tube (CRT) displays, a LCD (liquid crystal display), or a TFT (thin film transistor) display. The display devices 28 may also be implemented on the flight deck 22 as "head-down" displays or a head-up display (HUD) projection on a fixed image combiner.

The communication radio 30 is used, as is commonly understood, to communicate with entities outside the aircraft 20, such as air-traffic controllers and pilots of other aircraft. The navigational radio 32 is used to receive from outside sources and communicate to the user various types of information regarding the location of the vehicle, such as Global Positioning Satellite (GPS) system and Automatic Direction Finder (ADF) (as described below). The audio device 34 is, in one embodiment, an audio speaker mounted within the flight deck 22.

Figure 2:
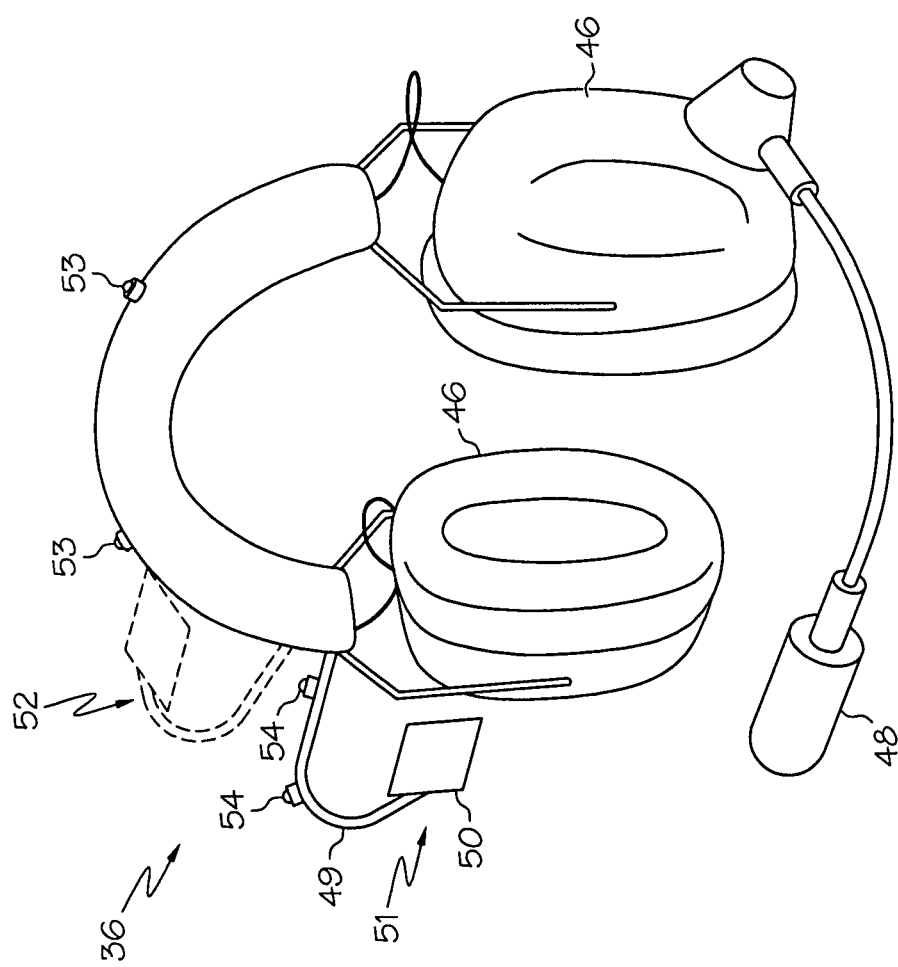
FIG. 2 is an isometric view of a headset including a near-to-eye (NTE) display within the aircraft of FIG. 1, according to one embodiment of the present invention.

Referring to FIG. 2, the headset 36 includes an interconnected combination of earphones 46, a microphone 48, and a near-to-eye (NTE) display (or display screen) 50. The earphones (or frame) 46 may substantially form a frame for the headset 36 and be configured to be removably worn by the pilot. The earphones/frame 46 and the microphone 48 may be in operable communication with the communications radio 30, and the NTE display 50 may be in operable communication with the avionics system 24, as described below. The NTE display 50 may be adjustably suspended from or connected to the frame 46 by an NTE arm 49 such that the display 50 may be positioned directly in front of an eye of the user 40 while the headset 36 is worn, as is commonly understood. In the embodiment depicted in FIG. 2, the NTE arm 49 is rotatably coupled to the frame 46 such that the NTE display 50 is manually movable between a first fixed position 51 and a second fixed position 52 (shown in dashed lines). As shown, in the first position 51, the display 50 may be positioned substantially directly in front of the user's eye, while in the second position 52, the NTE display 50 may be in a "storage" position (i.e., when not in use). In one embodiment, the NTE display 50 is an image combiner (i.e., a substantially transparent plate), as is commonly understood. The NTE display 50 may also be, for example, a flat panel display screen, such as an LCD display screen, and may include optics, such as collimating optics, which affect the focus characteristics of the display.

Still referring to FIG. 2, the headset 36 also includes multiple light emitting diodes (LEDs). In the depicted embodiment, the headset 36 includes four LEDs with two of the LEDs 53 being connected to the frame 46 and two of the LEDs 54 being connected to the NTE arm 49. As such, LEDs 53 are in a fixed position relative to the frame 46 (or a portion thereof) of the headset 36, and LEDs 54 are in a fixed position relative to the NTE display 50. The LEDs 53 and 54 may be connected to the respective portions of the headset 36 such that they are directed, or aimed, substantially upwards (i.e., along the z-axis) when the user's head is centered.

Figure 3:
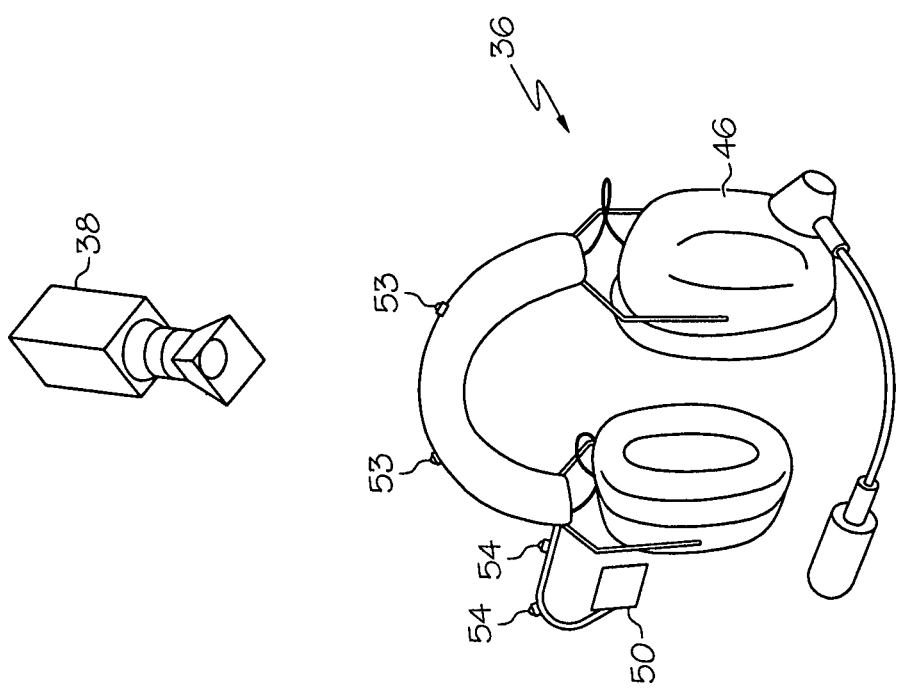
FIG. 3 is an isometric view of the headset of FIG. 2 and a motion tracking device.

Referring to FIGS. 1, 2, and 3, the motion tracker 38 is configured to detect movements (i.e., position and angular orientation) of the pilot's head, the headset 36 as a whole, and/or the NTE display 50. In the depicted embodiment, the motion tracker 38 is a camera (or other electromagnetic sensor) in a fixed position within the flight deck 22 substantially above the headset 36 and directed downwards towards the headset 36. The motion tracker 38 may be considered to jointly form a tracking system or assembly with the LEDs 53 and 54 on the headset 36. More particularly, the motion tracker 38 and LEDs 53 may jointly form a first tracking assembly, and the motion tracker and LEDs 54 may jointly form a second tracking assembly. Although not shown, the motion tracker 38 may include a processor separate from the processor 74 (FIG. 1) which is configured to determine the positions and movements of the frame 46 and NTE display 50 of the headset 36 based on, for example, the observed relative positions of the LEDs 53 and 54 relative to the Cartesian coordinate system shown in FIG. 3. That is, the positions of the frame 46 and the NTE display 50 may be defined within a range of positions along the x, y, and z-axes shown and/or a range of angular orientations about the x, y, and z-axes (i.e., six degrees of freedom), which is used to control the NTE display 50, as described below.

As shown in FIG. 1, the avionics/flight system 24 includes a runway awareness and advisory system (RAAS) 54, an instrument landing system (ILS) 56, a flight director 58, a weather data source 60, a terrain avoidance warning system (TAWS) 62, a traffic and collision avoidance system (TCAS) 64, a plurality of sensors 66 (e.g., a barometric pressure sensor, a thermometer, and a wind speed sensor), one or more terrain databases 68, one or more navigation databases 70, a navigation and control system (or navigation computer) 72, and a processor 74. The various components of the avionics/flight system 24 are in operable communication via a data bus 76 (or avionics bus). Although not illustrated, the navigation and control system 72 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor 74 may be any one of numerous known general-purpose controllers or an application specific processor that operates in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 78 and on-board ROM (read only memory) 80. The program instructions that control the processor 74 may be stored in either or both the RAM 78 and the ROM 80. For example, the operating system software may be stored in the ROM 80, whereas various operating mode software routines and various operational parameters may be stored in the RAM 78. The RAM 78 and/or the ROM 80 may include instructions stored thereon for carrying out the methods and processes described below. It will be appreciated that this is merely exemplary of one scheme for storing operating system software and software routines, and that various other storage schemes may be implemented. It will also be appreciated that the processor 74 may be implemented using various other circuits, not just a programmable processor. For example, digital logic circuits and analog signal processing circuits could also be used.

During operation of the aircraft 20, the headset 36 is worn by the pilot 40 (or other user), and the earphones 46 and the microphone 48 are used to communicate with ground personnel, as well as other aircraft. Additionally, the NTE display 50 is adjusted such that it is positioned directly in front of one of the user's 40 eyes.

Figure 4:
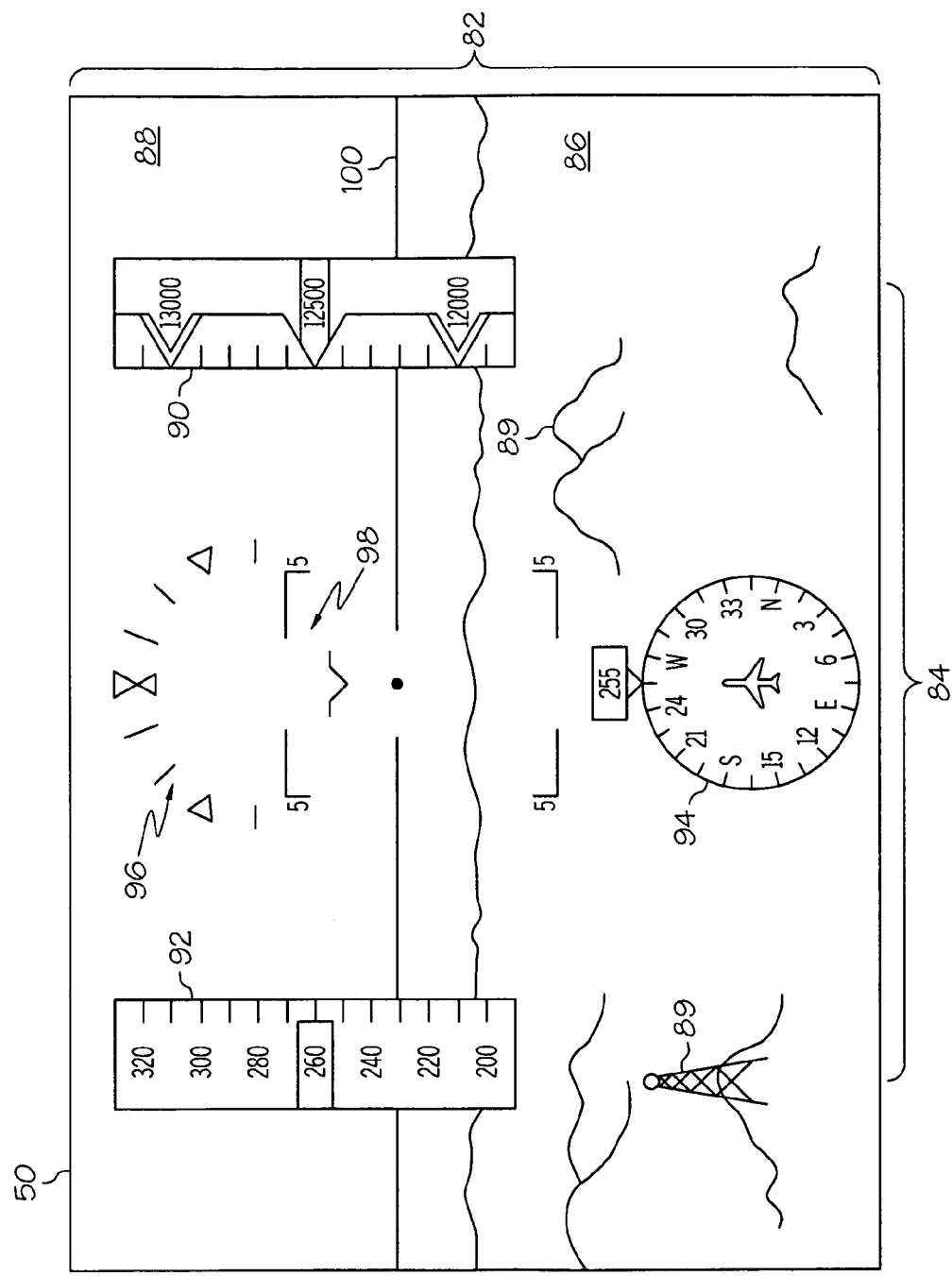
FIG. 4 is a plan view of the NTE display with an image rendered thereon.

FIG. 4 illustrates the NTE display 50 during operation, according to one embodiment of the present invention. On the NTE display 50 are shown a terrain image 82 and a symbology image (or simply "symbology") 84. The terrain image 82 is at least representative of the pilot's view from the flight deck 22. In the exemplary embodiment shown in FIG. 3, the terrain image 82 depicts a perspective view from the aircraft 20 of the terrain outside the aircraft 20 and covers substantially the entire display 50. The terrain image 82 includes a terrain portion 86 and a sky portion 88. As is commonly understood, in an embodiment in which the display 50 is an image combiner, the terrain image 82 is simply the pilot's 40 view of the terrain (and/or the interior of the flight deck 22) as seen through the NTE display 50. In an embodiment in which the NTE display 50 is, for example, an LCD display, the terrain image 82 is generated based on multiple readings from various instruments onboard the aircraft 20 that provide a current position and/or orientation (e.g., heading) of the aircraft 20 and changes as the position and/or orientation of the aircraft 20 changes, as well as the terrain and navigational databases 68 and 70 (FIG. 1). As such, in one embodiment, the terrain image 82 also includes conformal components 89 that, in an embodiment in which the display 50 is a HUD, are shown as to overlay corresponding "real world" components outside the aircraft 20. Examples of conformal components 89 include terrain features (e.g., hills, mountains, valleys, etc.) and landmarks (e.g., runways, radio towers, etc.).

Still referring to FIG. 4, the symbology 84 is displayed over terrain image 100. The symbology 84 includes multiple digital instruments, such as an altitude indicator 90, an airspeed indicator 92, a heading indicator 94, a roll indicator 96, and a pitch indicator 98. In the embodiment illustrated, the altitude indicator 90 and the airspeed indicator 92 are displayed as an altitude "tape" and an airspeed tape, respectively, as is commonly understood. The heading indicator 94 is graphically displayed as a compass at a lower center portion of the display 50. The roll indicator 96 is displayed above the heading indicator 94 at an upper portion of the display 50, and the pitch indicator 98 is positioned between the heading indicator 94 and the roll indicator 96. The digital instruments 90-98 provide an indication of a position and/or orientation (i.e., heading, pitch, roll, etc.) of the aircraft 20 to the user 40. As shown, the NTE display 50 also includes a horizon bar 100, which may be considered to be part of either the terrain image 82 or the symbology image 84, or alternately part of neither. The horizon bar 100 extends horizontally near the center of the screen 50, through the pitch indicator 98.

As will be appreciated by one skilled in the art, the particular appearance of the terrain image 82 (and perhaps the symbology 84) on the NTE display 50 is dependent upon the spatial coordinates of the NTE display 50 (i.e., the position and angular orientation of the NTE display 50). That is, as the pilot's head moves, the images that should be shown on the NTE display 50 change, particularly the conformal components 89.

Figure 5:
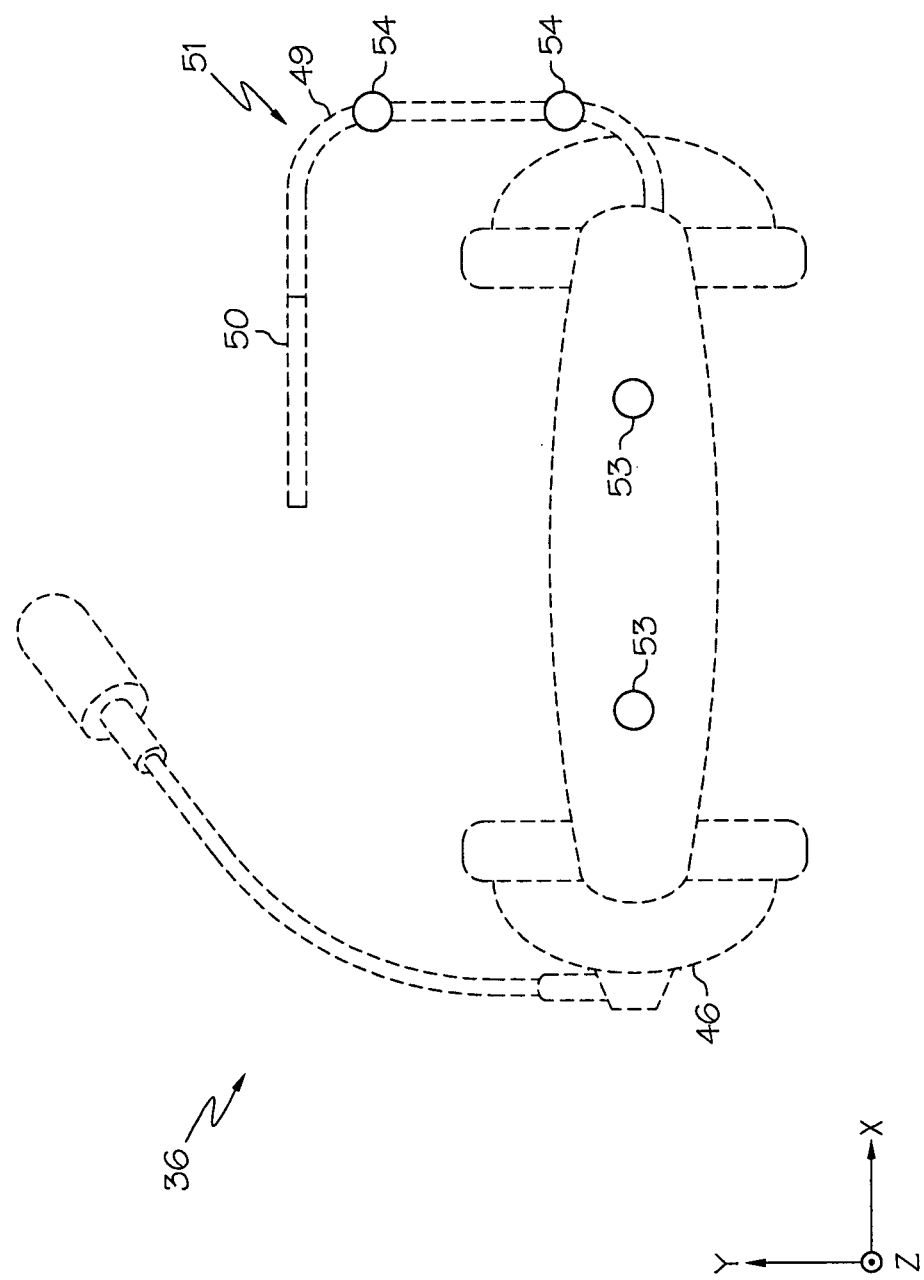
FIGS. 5 and 6 are schematic illustrations of the headset of FIG. 3 as observed by the motion tracking device.

FIG. 5 illustrates the headset 36 (particularly the LEDs 53 and 54) as observed by the motion tracker 38. As will be appreciated by one skilled in the art, the LEDs 53 and 54, and more particularly the signals generated by the LEDs 53 and 54 (i.e., the light emanating therefrom) are representative of the overall spatial coordinates (i.e., position and angular orientation) of the headset 36, as well as the position and angular orientation of the NTE display 50 relative to the frame 46 of the headset 36. Using, for example, a linear analysis or a nonlinear least squares analysis, the motion tracker (and/or the processor therein) 38 calculates the spatial coordinates of the NTE display 50 based on the information generated by the appearance of the LEDs 53 and 54 on the headset 36. As alluded to above, the spatial coordinates of the NTE display 50, or a subset thereof, are then used (e.g., by the processor 74) to determine the appearance of the image(s) shown on the NTE display 50, as well as changes in the image(s).

Figure 6:
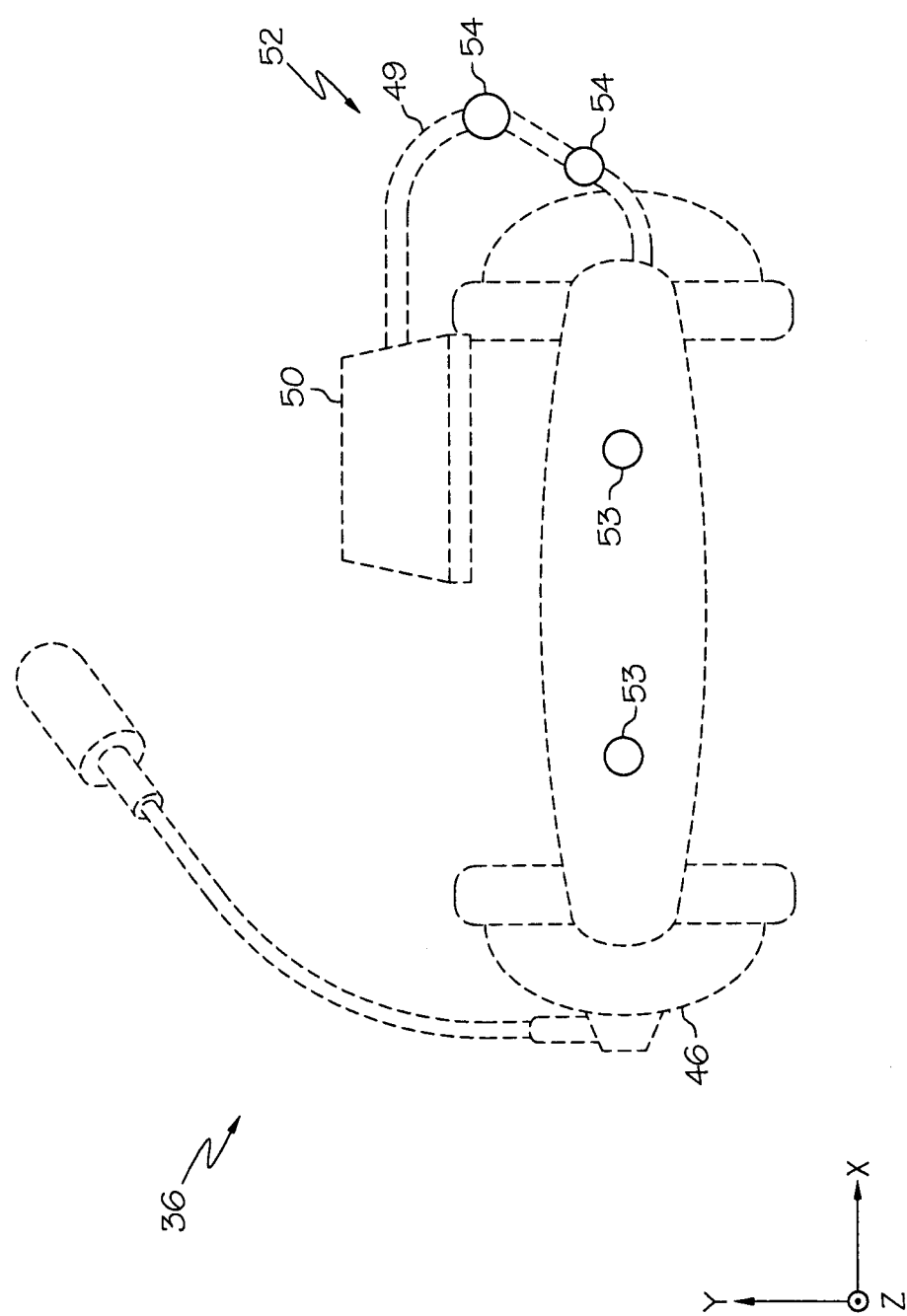

The calculation of the spatial coordinates of the NTE display 50 may include a determination of the at least one degree of freedom of the NTE display 50 relative to the degree(s) of freedom of the headset 36. Such information may be useful for not only determining the appearance of the image on the NTE display 50, but for controlling the mode of operation of the NTE display 50. For example, FIG. 6 illustrates the headset 36 as shown in FIG. 5, but with the NTE display 50 moved into the second position 52. When comparing the positions of the LEDs 53 and 54 in FIGS. 5 and 6, it is clear that LEDs 53 (i.e., on the frame 46) have moved very little, if at all, while LEDs 54 (i.e., on the NTE arm 49) have moved noticeably (e.g., the distance therebetween has been reduced and the parallax angle has changed). As such, it is apparent that the NTE display 50 has moved relative to the frame 46 of the headset 36 (e.g., into the second position 52). In one embodiment, when the NTE display 50 is moved into the second position, the NTE display 50 is not operated (i.e., it is "turned off").

As is understood in the art, determination of a full six degrees of freedom (e.g., x, y, z plus three Euler angles of orientation) typically requires a minimum of six independent input variables. In the case of tracking a rigid assembly, the motion tracker 38 of FIG. 3 may, for example, monitor the position of three LEDs within its field of view. Each reference element, or LED, may yield two positional coordinates on the camera sensor (i.e., the motion tracker 38), not shown, for example x' and y'. With three LEDs, this results in six inputs, which is typically sufficient to extract the six degrees of freedom within the frame of reference of the camera. In the embodiment shown in FIG. 3, there is a seventh degree of freedom which is the orientation of the NTE display 50 with respect to the frame 46. The addition of a fourth LED, for example one of LEDs 54, increases the number of inputs to eight, which may be used to determine the enlarged set of seven degrees of freedom in the case of the movably coupled display arm. Other embodiments may provide additional redundant data points to either of these scenarios (e.g., multiple cameras, additional LEDs) to maintain tracking capability in the case of obscuration, element failure or other non-ideal conditions.

Figure 7:
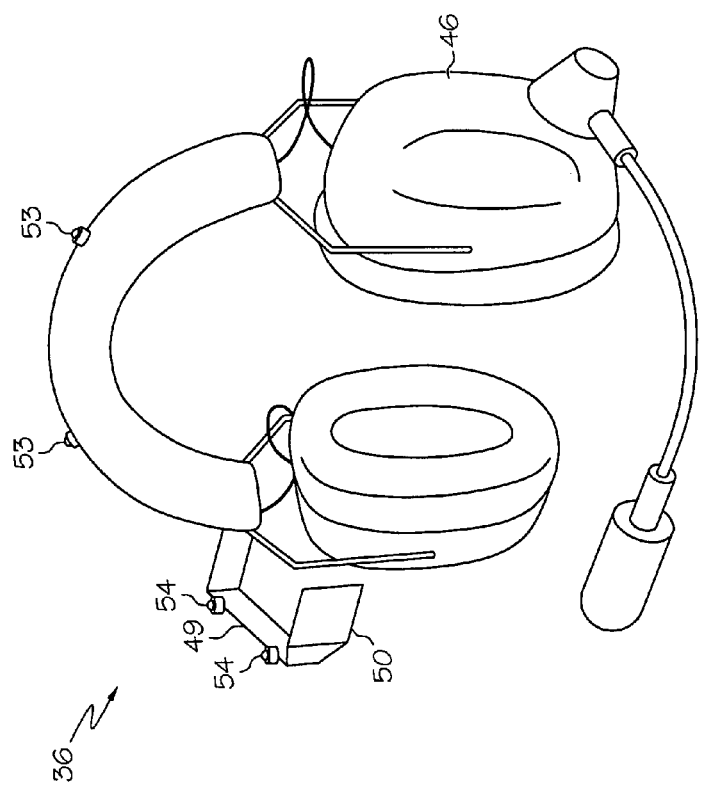
FIGS. 7 and 8 are isometric views of headsets according to other embodiments of the present invention.

FIG. 7 illustrates the headset 36 according to another embodiment of the present invention. Of particular interest in the embodiment shown in FIG. 7 is that the NTE arm 49 is connected to the frame 46 of the headset 36 in a fixed position. However, as will be appreciated by one skilled in the art, the NTE display 50 may still experience movement relative to the frame 46 of the headset 36, such as adjustment, flexing or "wobbling" of arm 49, such as may be caused by head motion or vibrations in the aircraft 20 (e.g., turbulence). It should be noted that such movements may be accounted for using the method and system described above and the image displayed on the NTE display 50 may be similarly adjusted, provided a sufficient number of inputs are collected to determine all relevant degrees of freedom. The calculation and minimization of errors are facilitated by characterizing the degrees of freedom and related properties of the coupling between reference elements (e.g., between LEDs in the embodiment shown). In a similar manner, flexible coupling between LEDs 53 or between LEDs 54 may also be detected and accounted for in the determination of the spatial coordinates of NTE display 50.

Figure 8:
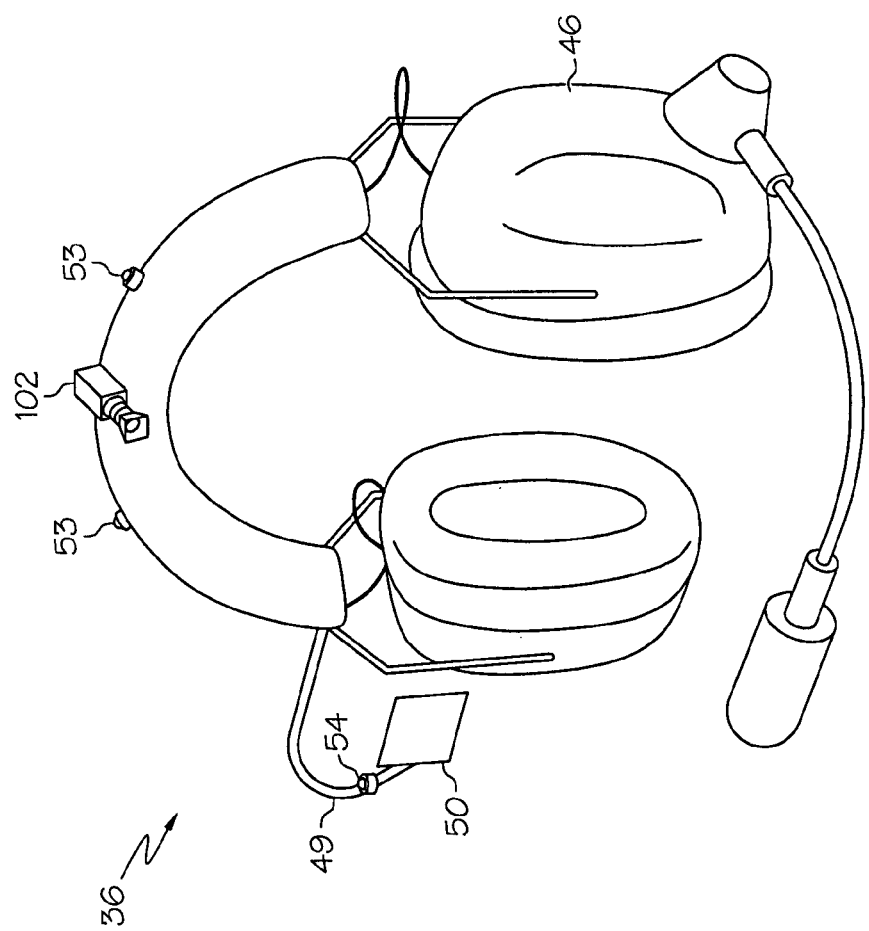

FIG. 8 illustrates the headset 36 according to a further embodiment of the present invention. Of particular interest in the embodiment shown in FIG. 8 is that the headset 36 includes a camera 102 connected to the frame 46 and, although not shown, in operable communication with the motion tracker 38 (and/or the processor 74). In such an embodiment, the camera 102 may be used to monitor the position and/or angular orientation of the NTE display 50 relative to the frame 46, while the LEDs 53 and 54 provide addition data as collected by motion tracker 38 (see FIG. 3). The spatial coordinates of the NTE display 50 and/or frame 46 of the headset 36 may then be determined using both sets of information. It should be understood that the positions of the LEDs may be changed, or that other types or numbers of reference elements may be substituted. For example, the position of the NTE display 50 relative to the frame 46 may be provided by an encoder or a potentiometer (i.e., in an embodiment in which the NTE arm 49 is movable between various positions). Similarly, LED 54 may be moved to the frame 46 if not required by the camera 102 or equivalent.

In each of these embodiments, there are both "internal degrees of freedom" between the NTE display 50 and/or other sections of the headset 36, and "external degrees of freedom" with respect to the operating platform in which the headset 36 is worn. The "internal degrees of freedom" may include those described in the preceding embodiments or others which may be either intended or unintended. The apparatuses and methods described herein provide sufficient inputs and means to determine the relevant number of degrees of freedom in light of determinable relationship constraints between the various components and subsystems. The elimination of an overriding rigidity constraint provides for increased separation between coupled reference elements while maintaining or increasing the practicality, performance and comfort of the resulting system.

One advantage of the method and system described above is that the spatial coordinates of the NTE display may be accurately determined. Another advantage is that the size and weight of the headset is minimized.

Although not shown, other embodiments may utilize different numbers of reference elements. For example, the headset (or the frame of the headset) and the NTE display may each include three LEDs and additional motion trackers (e.g., cameras) may be used. Other embodiments may include different types of reference elements and their relative positions may be switched or changed. The method and system described above may be utilized on vehicles other than aircraft, such as land vehicles and watercraft, or in the absence of vehicular platforms. Although the embodiment shown in the drawings incorporates a headset, it should be understood that the methods and system described herein may also be used on other head-worn headset devices, such as helmets, goggles, or ear-supported devices. Other embodiments are possible in which the NTE display is not present, but other components are movably coupled and jointly tracked using the above-described methods. The method and system may also be used on unmanned vehicles, in which an operational range limit of the headset corresponds to a station where a user remotely controls the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a near-to-eye (NTE) display movably coupled to a headset, the method comprising:
generating information representative of at least one spatial degree of freedom of the NTE display relative to at least one spatial degree of freedom of the headset based on a single camera sensing two reference elements of the NTE display relative to two reference elements of the headset;

receiving the information representative of at least one spatial degree of freedom of the NTE display relative to at least one spatial degree of freedom of the headset within an environment;

determining spatial coordinates of the NTE display relative to the headset within the environment based on said received information; and adjusting a conformal appearance of an image or a symbol representing a conformal component on the NTE display based on the spatial coordinates of the NTE display relative to the headset.

2. The method of claim 1, wherein the reference elements of the headset and the NTE display comprise electromagnetic emitters.

3. The method of claim 2, wherein two electromagnetic emitters are in a fixed position relative to the NTE display and two electromagnetic emitters are in a fixed position relative to the headset.

4. The method of claim 3, wherein the determining the spatial coordinates of the NTE display comprises calculating the at least one spatial degree of freedom of the NTE display relative to the at least one spatial degree of freedom the headset based on said received information.

5. The method of claim 1, wherein the NTE display is movably coupled to the headset such that the NTE display is movable between first and second fixed positions relative to the headset.

6. An avionics system comprising:

a headset comprising a frame configured to be worn on a head of a user; a near-to-eye (NTE) display movably coupled to the frame of the headset;

a single sensor and two reference elements of the frame and two reference elements of the NTE display configured to generate information representative of at least one spatial degree of freedom of the NTE display relative to at least one spatial degree of freedom of the frame; and a controller in operable communication with the NTE display, the controller being configured to:

receive the information representative of at least one spatial degree of freedom of the NTE display relative to at least one spatial degree of freedom of the frame within an environment;

determine spatial coordinates of the NTE display relative to the frame within the environment based on said received information; and adjust a conformal appearance of an image or a symbol representing a conformal component on the NTE display based on the spatial coordinates of the NTE display relative to the frame.

7. The avionics system of claim 6, wherein the reference elements of the NTE display and the frame comprises light emitting diodes (LEDs).

8. The avionics system of claim 7, wherein the NTE display is movably coupled to the frame of the headset such that the NTE display is movable between first and second fixed positions relative to the frame of the headset.

9. The avionics system of claim 8, wherein the single sensor comprises an electromagnetic sensor in a fixed position relative to the frame of the headset and configured to detect the at least one spatial degree of freedom of the NTE display relative to the at least one spatial degree of the frame of the frame.

* * * * *